United States Patent Office 3,235,583
Patented Feb. 15, 1966

3,235,583
PREPARATION OF ASPIRIN
Robert T. Edmunds, Norwich, N.Y., assignor to The Norwich Pharmacal Company, Norwich, N.Y., a corporation of New York
No Drawing. Filed July 22, 1964, Ser. No. 384,544
3 Claims. (Cl. 260—480)

This invention relates to an improved method of preparing aspirin (acetyl salicylic acid) and is a continuation-in-part of my earlier filed pending application, Serial No. 126,440, filed July 14, 1961, and now abandoned, which, in turn, was a continuation-in-part of my copending application Serial No. 819,236, filed June 10, 1959, and now abandoned.

For many years the method customarily employed to prepare aspirin of a degree of purity that is acceptable for pharmaceutical purposes, and in a form that lends itself to the ready tableting of the aspirin, involved a multi-step method which is both cumbersome and expensive. In that method, salicylic acid and acetic anhydride were reacted at elevated temperature and the product of the reaction was crystallized through controlled cooling in such manner that the largest possible amount of the end product recovered thereby would be in the desired crystalline form most readily adapted to tableting. The end product was then filtered out, washed and dried but it was frequently necessary to resort to recrystallization to obtain the desired crystalline form of end product and to free it from impurities. The filtrate which was produced in this process was distilled to obtain additional quantities of the end product and also to recover solvents and unrelated reagents for recycling.

I have discovered that it is possible to prepare aspirin through a vastly simplified method which results in a very substantial reduction in the cost thereof, and it is a particular feature of my invention that the aspirin that can be produced thereby is not only substantially pure but it is also in the form of the desired needle-like crystals which most readily lend themselves to easy tableting.

My method is based on the discovery that crystalline aspirin can be produced by heating a mixture of salicylic acid and a fractional molar excess of acetic anhydride and directly distilling to dryness at elevated temperatures and under reduced pressure; the acetic anhydride and salicylic acid can be reacted and distilled to dryness in a single step in one vessel from which nearly theoretical yields of substantially pure crystalline aspirin are directly obtained. This eliminates filtration, washing and drying of crystals and workup or refinement of process liquors, operations which require additional equipment and which are inherent in past methods.

A particularly surprising feature of my method is that distillation to dryness has produced aspirin of over 99.5% purity, whereas it would be anticipated on the basis of prior experience that impurities would be formed in excess of 0.5%. In addition to the high purity of my aspirin, near theoretical yields of aspirin and by-product acetic acid are obtained by my method. These high yields are primarily due to the fact that there is no occasion for loss of these materials through the precipitation, filtration, washing and reworking of mother liquors that have been necessary in the past.

The salicylic acid and acetic anhydride may be reacted and distillation of the reaction mixture under reduced pressure to recover liquids and to secure a crystalline product may be conveniently and satisfactorily carried out in apparatus such as stainless steel or glasslined blenders, ball mills and the like which are equipped to agitate the reaction mixture. I now prefer to use a conical, jacketed, dryer-blender of the type presently available on the market, but other like apparatus adapted to provide agitation, heat and means for liquid recovery may be employed.

In the practice of my invention, the method which I currently prefer consists in mixing acetic anhydride and salicylic acid in a glasslined jacketed, conical dryer-blender which is revolvable on its central axis. I have found that an excellent yield of aspirin of exceptional quality can be obtained through the practice of my process when a slight molar excess of acetic anhydride is used. The quantity of acetic anhydride exceeds by about 2% to about 20% (18% being preferred) the stoichiometric equivalent of salicylic acid that is charged into the reaction vessel. An inert, organic diluent such as acetic acid, benzene, toluene or xylene may be added advantageously, but is not essential to the reaction. The reaction mixture is heated through the jacket of the dryer-blender by the introduction of steam, or hot water or other suitable heat transfer medium to about 45° to 95° C. Thereafter the pressure within the reaction vessel is reduced by exhaustion to produce a partial vacuum while maintaining a jacket temperature of about 45°–95° C. The internal pressure is reduced initially to about 120–170 mm. of mercury absolute and progressively decreased at a rate of about 5 to 50 mm. per hour until visible distillation of liquids ceases. For complete removal of vapors and drying of the aspirin crystals, the pressure is preferably reduced to somewhere between the minimum obtainable in the system and 30 mm. and held at this pressure for several hours. The crystalline product is readily removed from the reactor by dumping.

While any inert diluent distillable under the above conditions may be used advantageously in the above method, acetic acid is particularly desirable since this permits the recovery of both the diluent and by-product acetic acid in a single step, in a relatively pure form suitable for recycling as the diluent for subsequent reactions.

The percentage of impurities (normally less than .5% by U.S.P. test procedures) contained in the aspirin produced through my new method can be further reduced by introducing into the reaction vessel from 1 to 2% by weight based on the total weight of the reaction mixture, of a quench consisting of water or acetic acid or a mixture thereof.

The quench is introduced after substantially complete distillation of the reaction mixture and prior to dumping of the crystals, preferably shortly after minimum pressure is attained in the reaction vessel. The quench is added to prevent trace amounts of acetic anhydride (which might remain after distillation) from reacting with the aspirin crystals to form sodium carbonate insoluble compounds. While these sodium carbonate insoluble compounds, formed in the absence of a quench, appear to be unstable and disappear upon storage, they nevertheless prevent the crystals obtained directly from the reactor from passing the full U.S.P. test procedure. Thus, addition of the quench in large scale operations facilitates the recovery of U.S.P. aspirin crystals directly from the reaction vessel.

In order that my invention may be readily available to and understood by those skilled in the art, the following specific examples thereof are given:

*Example I*

The following runs were made in a round bottomed Pyrex flask of 1,000 cubic centimeter capacity and the flask was attached to a rotary vacuum connection that would allow the flask to be laid upon its side and rotated in a water bath at elevated temperatures and reduced pressures.

(a) 140 grams of salicylic acid and 110 grams of acetic anhydride (a 6.8% molar excess) were heated at 75° C. for 90 minutes and the vacuum then applied at about 150 mm. of mercury absolute pressure. The vacuum was gradually lowered to about 30 mm. of mercury absolute pressure over a period of about 90 minutes and held at 30 mm. for an additional 30 minutes at said elevated temperature. A yield of 179 grams out of a theoretical of 181 grams of substantially pure aspirin crystals was recovered directly from the flask. The U.S.P. test for sodium carbonate insoluble materials on the product was negative indicating that no anhydride derivatives of aspirin had been formed. Impurities of about 1% unreacted salicylic acid, however, were found.

(b) 140 grams of salicylic acid, 120 grams of acetic anhydride and 142 grams of toluene as a diluent were placed in the flask and heated to 85° C. for about 40 minutes. The absolute pressure in the flask was reduced to 170 mm. pressure at said temperature and held for 3 hours. The absolute pressure was then gradually lowered to 2 mm. of mercury over a period of about 30 minutes. Aspirin crystals were recovered directly from the flask and washed with carbon tetrachloride and dried in an electric oven at 50° C. for 2 hours. 180 grams of aspirin were obtained and 211 grams of solvent (toluene and excess acetic anhydride) and by-product acetic acid were recovered. The yield of aspirin based on salicylic acid was 99% of theoretical and the recovery of solvent was 96.5%. Melting point of finished material was 135–138° C. Free salicylic acid was .01% U.S.P. test and the material assayed 100.1% aspirin by U.S.P. test.

(c) 140 grams of salicylic acid, 122 grams of acetic anhydride (a 17.5% molar excess) and 95 grams of acetic acid were reacted for 16 hours in the apparatus described above in a water bath held at 45° C. The absolute pressure was reduced to 120 mm. of mercury to produce distillation and gradually reduced to 20 mm. of mercury until a dry product was obtained (about 2 hours). This product was found to contain 35% unreacted salicylic acid with the rest being aspirin. The recovered weight of dry material was 163 grams which checks closely with the theoretical weight that should be obtained for a mixture of 65% aspirin and 35% salicylic acid, resulting from the starting materials. U.S.P. test for materials insoluble in sodium carbonate solution was negative.

(d) The above run was repeated without the acetic acid. In this case the mixture was held at 45° C. for 20 hours before distillation was started, and the resulting dry crystals contained only 20% unreacted salicylic acid. The total solids recovered were 170 grams. The above two runs indicate that the reaction can be expected to proceed toward completion as the time is increased at these relatively low temperatures.

*Example II*

The runs included in Table I were carried out as follows: Salicylic acid was loaded directly into a five cubic foot glasslined, jacketed, conical dryer-blender adapted for distillation under vacuum and then the acetic acid and finally the acetic anhydride were introduced by applying a slight vacuum to the unit. After loading, the blender was closed and started revolving, while water was circulated through the jacket at a temperature of 90° C. When the temperature within the unit reached about 88° C. as indicated by a dial thermometer installed in one of the loading ports, vacuum was applied and the pressure reduced to about 170 mm. of mercury absolute pressure. This pressure was held for one hour after which the absolute pressure was lowered approximately 15 mm. of mercury per hour for 4½ hours, at which point the absolute pressure was lowered at a rate of 120 mm. of mercury per hour for the next hour to the minimum absolute pressure attainable in the system; i.e., 20 and 30 mm. of mercury absolute. During the controlled decrease in absolute pressure, the liquids in the reactor distilled at a steady rate and by the time that minimum absolute pressure had been obtained the reactor contained crystals of aspirin which were relatively dry. In this particular series of runs an additional 2 to 3 hours at minimum pressure were allowed with the jacket circulating temperature at 90° C. and then the crystals were dumped and weighed. Tests of crystals in this series were restricted to an assay for percent aspirin and for free salicylic acid as specified in the U.S.P. In Run No. 5, a complete series of U.S.P. tests for aspirin was carried out and the material was satisfactory. A fluctuation in yield from 82% of the theoretical to 104% of theoretical will be noted. This fluctuation in yield is due to the fact that a certain amount of materal adhered to the walls of the reactor in each run. The reactor was not cleaned between runs so that after the first run or two almost theoretical yields were obtained. It was observed by opening the reactor that the material left on the walls from run to run actually dissolved and therefore was eventually recovered.

TABLE I

| Run No. | Notes reactor clean | Salicylic acid, lbs. | Acetic anhydride, lbs. | Acetic acid, lbs. | Water jacket temp., ° C. | Aspirin yield, percent of theory | U.S.P. tests | | | |
|---|---|---|---|---|---|---|---|---|---|---|
| | | | | | | | Aspirin assay percent | Free salicylic acid test | Insolubility tests [1] | Other tests |
| 1 | Yes | 69 | 56 | 25 | 90 | 82 | 100.7 | OK | | |
| 2 | No | 69 | 56 | 25 | 90 | 92 | 99.78 | OK | | |
| 3 | No | 69 | 56 | 25 | 90 | 91 | 99.8 | OK | | |
| 4 | No | 69 | 56 | 25 | 90 | 100 | 99.5 | OK | | |
| 5 | No | 69 | 56 | 25 | 90 | 104 | 99.5 | OK | OK | OK. |
| 6 | No | 69 | 56 | 25 | 90 | 100 | 99.79 | OK | | |

[1] Test for materials insoluble sodium carbonate.

*Example III*

Data presented in Table II represent runs made in a plant or commercial scale 110 cubic foot glassline rotary-conical vacuum-dryer made by Glasscote Products, Inc., and similar in design to the 5-cubic foot unit used to collect the data in Table I. A manufacturing change from the small scale work was the installation of a 400-gallon glassline jacketed scale or weighing tank into which the salicylic acid, the acetic acid, and the acetic anhydride were charged. Water was circulated through the jacket of this tank at 88° C. and the tank agitated until solution was obtained. By adding warm acetic acid and acetic anhydride to this tank, solution was obtained in approximately the same elapsed time as in the smaller unit. With the material in solution, vacuum was applied to the reactor (the dryer blender) and the solution in the scale tank was pulled through a stainless steel filter into the reactor. The use of the scale tank allows convenient, accurate weighing of all ingredients and also permits filtration of the reaction mixture, a desirable precaution even when using U.S.P. quality raw materials. After the solution was in the reactor, the cycle was quite similar to the smaller runs. The pressure was reduced and held for one hour at 150 mm. mercury absolute, the absolute pressure was further reduced at a rate of 15 mm. per hour for 3½ hours and at this point the pressure was reduced at the rate of 120 mm. per hour until a minimum absolute pressure of 20 to 30 mm. of mercury was attained. At the break point where the more rapid decrease in absolute pressure was begun, various temperatures of the water circulating in the reactor jacket were tried as indicated in the table.

of acetic acid was approximately 75% due to the many opportunities for losses inherent in the processes.

| Run No. | Notes reactor clean | Salicylic acid, lbs. | Acetic anhydride, lbs. | Acetic acid, lbs. | Water jacket temp., °C. | | Aspirin, yield percent of theory | Acetic acid, yield percent of theory | U.S.P. tests | | | |
|---|---|---|---|---|---|---|---|---|---|---|---|---|
| | | | | | Above break point | Below break point | | | Aspirin assay, percent | Free salicylic acid test | Insolubility tests [2] | Other tests |
| 7 | Yes | 1,395 | 1,119 | 626 | 88 | (¹) | 98.5 | 97 | 99.83 | OK | OK | OK. |
| 8 | Yes | 1,395 | 1,119 | 626 | 88 | 50 | 99.2 | 95 | 99.99 | OK | OK | OK. |
| 9 | Yes | 1,395 | 1,122 | 626 | 88 | 72 | 98.9 | 97.5 | 99.99 | OK | OK | OK. |
| 10 | Yes | 1,395 | 1,122 | 626 | 88 | 72 | 99.0 | 96.0 | 99.523 | OK | OK | OK. |

[1] Steam off.
[2] Test for materials insoluble sodium carbonate.

In the large scale runs the addition of water or water mixed with acetic acid, provided a practical method of preventing the formation of "materials isoluble in sodium carbonate." In Run No. 7, 10 lbs. of water in 30 lbs. of acetic acid were added when the absolute pressure reached its minimum point; i.e., 20–30 mm. In Run No. 8, 20 lbs. of water in 20 lbs of acetic acid where added at approximately the same point. In Run No. 9, 20 lbs. of water in 20 lbs. of acetic acid were added at the point at which visible distillation had ceased, approximately 40 minutes after the minimum absolute pressure was reached. In Run No. 10, 20 lbs. of water in 20 lbs. of acetic acid were added at about 20 minutes after minimum pressure was reached. In each case the conditions were maintained until all distillation ceased. The material produced was suitable for use preferably after deodorization and screening. Removal of residual trace odors can be accomplished in various ways; (1) by application of an absolute pressure in the range of 3 mm. of mercury for a period of about 40 minutes; (2) by drawing dry air at room temperature through the material for a period of 15 hours; or (3) by passing the material once through a standard tubular hot air rotary dryer.

The large scale reactor tests showed less of a tendency for the material to adhere to the walls as can be seen by the fact that starting with a substantially clean reactor, a yield of 99% of the theoretical based on salicylic acid was obtained in most cases. This high yield coupled with the good recovery of by-product acetic acid; i.e., in the neighborhood of 97%, represents a substantial saving over earlier aspirin processes where the over-all yield of aspirin was in the range of 91% of theoretical and the recovery

What I claim is:
1. In the method of preparing acetyl salicylic acid by reacting a mixture of salicylic acid and acetic anhydride at an elevated temperature of 40° C. to 95° C. the improvement which comprises:
 employing a molar excess of about 2 to about 20% of acetic anhydride;
 reacting said mixture in a closed vacuum equipped vessel at said elevated temperature;
 maintaining said elevated temperature and reducing the internal pressure to a partial vacuum within the range of about 120 mm. to 170 mm. of mercury absolute and thereafter gradually reducing said pressure to a range between about 30 mm. and the minimum pressure obtainable in the system;
 maintaining said elevated temperature and reduced pressure at the lower range for about 1 to 3 hours; and
 thereafter recovering acetyl salicylic acid directly from said vessel in a pure dry crystalline form.

2. The method according to claim 1, wherein an inert distillable diluent selected from the group consisting of acetic acid, benzene, toluene and xylene is added to the reaction mixture prior to distillation.

3. The method according to claim 1, wherein about 1% to 2% by weight, based on the total weight of the reaction mixture, of a quench selected from the group consisting of water, acetic acid and mixtures thereof, is added to said vessel after distilling to substantial dryness and one-half to two hours prior to recovery of the crystals from said vessel.

References Cited by the Examiner

UNITED STATES PATENTS 2,423,569  7/1947  Sokol _____ 260—480
2,731,492  1/1956  Kamlet _____ 260—480
3,061,632  10/1962  Surine et al. _____ 260—480

LORRAINE A. WEINBERGER, *Primary Examiner.*